US008284785B2

United States Patent
Hirata (10) Patent No.: US 8,284,785 B2
(45) Date of Patent: Oct. 9, 2012

(54) SYSTEM AND METHOD FOR DIRECT COMMUNICATIONS BETWEEN FCOE DEVICES

(75) Inventor: Kenneth Hiroshi Hirata, Costa Mesa, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 305 days.

(21) Appl. No.: 12/549,302

(22) Filed: Aug. 27, 2009

(65) Prior Publication Data
US 2011/0051733 A1 Mar. 3, 2011

(51) Int. Cl.
*H04L 12/28* (2006.01)
*H04L 12/56* (2006.01)

(52) U.S. Cl. ........ 370/400; 370/254; 370/255; 370/351; 370/389; 370/392; 370/401; 370/465; 370/466; 370/467

(58) Field of Classification Search .................. 370/254, 370/255, 351, 389, 392, 400, 401, 465–467
See application file for complete search history.

(56) References Cited

U.S. PATENT DOCUMENTS

| | | | |
|---|---|---|---|
| 2006/0130052 A1* | 6/2006 | Allen et al. | 717/172 |
| 2008/0159260 A1* | 7/2008 | Vobbilisetty et al. | 370/351 |
| 2009/0037977 A1* | 2/2009 | Gai et al. | 726/1 |
| 2009/0161692 A1* | 6/2009 | Hirata et al. | 370/466 |
| 2009/0292813 A1* | 11/2009 | Snively et al. | 709/228 |
| 2010/0232419 A1* | 9/2010 | Rivers | 370/352 |

* cited by examiner

*Primary Examiner* — Phirin Sam
*Assistant Examiner* — Blanche Wong
(74) *Attorney, Agent, or Firm* — Morrison & Foerster LLP (57) ABSTRACT

Disclosed is an improved mechanism for direct communications and frame routing between FCoE devices within an Ethernet network supporting FCoE protocols. In particular, the methods and systems disclosed herein enable direct communications from one FCoE device to another without going through any intermediary such as an FCF (FCoE Forwarder) that is designed to route traffic between FCoE devices according to the current FCoE standards. This is accomplished by registering the Ethernet MAC address of an FCoE device in a name server via certain objects presently used in an FIP fabric login request, e.g., Port_Name or Node_Name, and other standard-specified objects and functionalities without requiring any changes to the existing FCoE and FC standards.

43 Claims, 8 Drawing Sheets

| BIT WORD | 31..24 | 23..16 | 15..8 | 7..0 |
|---|---|---|---|---|
| 0 | 1h | 0 00h | MAC ADDRESS[0] | MAC ADDRESS[1] |
| 1 | MAC ADDRESS[2] | MAC ADDRESS[3] | MAC ADDRESS[4] | MAC ADDRESS[5] |

SYSTEM AND METHOD FOR DIRECT COMMUNICATIONS BETWEEN FCOE DEVICES

FIELD OF THE INVENTION

This relates generally to the FCoE (Fibre Channel over the Ethernet) protocol, and more particularly, to the registration and discovery of the MAC (Media Access Control) addresses of FCoE devices over an Ethernet network that allows for direct communications between different FCoE devices without routing traffic through any intermediary, such as an FCF (FCoE Forwarder) or FC switch, as specified in the current FCoE standards.

BACKGROUND OF THE INVENTION

Fibre Channel over the Ethernet (FCoE) is an emerging protocol that allows organizations to extend the reliability and network services of Fibre Channel (FC) to a broader range of server environments, such as a new Converged Enhanced Ethernet (CEE) infrastructure designed to consolidate multiple transport layers on a single physical interconnect, thereby reducing the cost and complexity of implementing a virtualized data center. In other words, FCoE enables the transport of existing Fibre Channel protocols over the CEE network. Specifically, FCoE encapsulates an FC frame in a manner similar to how an IP packet is included in an Ethernet packet, and inserts a defined frame header before the FCoE frame containing the FC frame is sent over the CEE link. FCoE also decapsulates an FC frame from a received FCoE frame so that the same FC operations can be performed over the CEE network without modifications to existing FC protocols. An FCoE switch is a device that exposes CEE and FC ports. Similar to a basic FC switch, the FCoE switch makes forwarding decisions based on the FC header of an FC frame encapsulated inside the FCoE frame, except that the FCoE switch supports communications between any ports on the switch, including an FCoE initiator talking to a FCoE target, an FC initiator to an FC target, and an FCoE initiator talking to an FC target.

Currently the FCoE standard is under development after several versions including the most recent one, FC-BB-5, rev. 2.00 as of June 2009, the contents of which are incorporated by reference herein in their entirety for all purposes. None of the existing or proposed FCoE standards provides a method for the VN_Port in one FCoE device to acquire the Ethernet MAC address of the VN_Port in another FCoE device so as to enable direct communications between FCoE devices. Instead, the present FCoE standard and technologies implementing the standard require an FCoE switching element, i.e., FCF (FCoE Forwarder), to transit traffic from an FCoE initiator to an FCoE target. Although certain alternatives have been proposed to enable direct communications between FCoE devices, most are not feasible in terms of technical difficulty or implementation cost. For example, one solution proposes to add a new object for storing the Ethernet address of an FCoE VN_Port to a network directory (e.g., the Name Server under the FC protocols), which, however, would not only cause a major change to the existing FCoE standards, but also require all vendors to update the name servers in order to support the new object. Therefore, a need exists to provide direct communications between FCoE devices without burdensome requirements on existing FCoE standards and product vendors.

SUMMARY OF THE INVENTION

Embodiments of the present invention relate to direct communications and frame routing between FCoE devices within an Ethernet network supporting FCoE protocols. In one embodiment, a method is provided to enable direct communications between a number of FCoE (Fibre Channel over Ethernet) devices in an Ethernet network. This method comprises: registering said FCoE devices with a name server in said Ethernet network, said name server configured to accept or reject registration of each FCoE device, and upon acceptance of a registration, store at least one object associated with the registered FCoE device; receiving, at said name server, a discovery request from an origination FCoE device to discover all other registered FCoE devices in said Ethernet network; and in response to said discovery request, retrieving a plurality of objects stored in said name server for said other registered FCoE devices and sending said objects to said origination FCoE device, each of said objects indicative of a MAC (Media Access Control) address of its associated FCoE device. Furthermore, the method comprises additional steps of: generating a fabric login request frame in said FCoE device in accordance with a pre-defined format, said fabric login request frame including a Port_Name and a Node_Name, either said Port_Name or said Node_Name containing a MAC (Media Access Control) address assigned to said FCoE device; and sending said fabric login request frame to a FCoE switch for a VN_Port to be created in said FCoE device, wherein said process further comprises: in response to said fabric login request frame, generating a fabric login reply frame in said FCoE switch, said fabric login reply frame containing said MAC address of said FCoE device and a port identifier assigned to said VN_Port in said FCoE device; sending said fabric login reply frame to said FCoE device; and registering said Port_Name and said Node_Name with said name server.

In accordance with another embodiment, provides is a method of registering an FCoE (Fibre Channel over Ethernet) device with a name server in an Ethernet network, which comprises: generating a fabric login request frame in said FCoE device in accordance with a pre-defined format, said fabric login request frame including at least a Port_Name that contains a MAC (Media Access Control) address assigned to said FCoE device; sending said fabric login request frame to a FCoE switch; in response to receiving said fabric login request frame in said FCoE switch, assigning a port identifier for a VN_Port to be created in said FCoE device; sending a fabric login reply frame to said FCoE device, said fabric login reply frame including said port identifier for said VN_Port and said MAC address contained in said Port_Name; and registering said Port_Name in said name server.

Another embodiment of the present invention provides a method for one FCoE (Fibre Channel over Ethernet) device to discover and directly communicate with other FCoE devices in an Ethernet network supporting FCoE protocols. The method comprises: sending a query from said one FCoE device to a name server to discover said other FCoE devices registered with said name server; in response to said query, retrieving one or more Port_Names or one or more Node_Names associated with said other FCoE devices that are pre-stored in said name server during a fabric login of each of said FCoE devices, each of said one or more Port_Names and Node_Names formatted to contain an Ethernet MAC address of its associated FCoE device; sending said retrieved one or more Port_Names or Node_Names associated with said other FCoE devices to said one FCoE device; generating a table in said one FCoE device in accordance with said retrieved one or more Port_Names or Node_Names, said table containing associations between a plurality of FC (Fibre Channel) port identifiers and a plurality of Ethernet MAC addresses of said other FCoE devices; and sending FCoE frames from said one FCoE device directly to any of said other FCoE devices in accordance with said table.

In yet another embodiment, a system is provided, which comprises: a plurality of FCoE (Fibre Channel over Ethernet) devices over an Ethernet network, said FCoE devices registered with a name server, wherein each FCoE device is configured to: query said name server to retrieve a plurality of objects associated with other FCoE devices, each of said plurality of objects indicative of a MAC (Media Access Control) address of its associated FCoE device, create a table based upon said plurality of objects, said table including associations between a plurality of FC (Fibre Channel) port identifiers and said MAC addresses of said FCoE devices; identify from said table a MAC address of a destination FCoE device corresponding to a destination FC port identifier; and sending FCoE frames with FC frames encapsulated therein directly to said destination FCoE device in accordance with said identified MAC address.

Also provided is an FCoE (Fibre Channel over Ethernet) device according to one embodiment of the invention. The FCoE device comprises: an FCoE controller; an Ethernet MAC (Media Access Control) coupled with said FCoE controller; an Ethernet port configured to interface with an Ethernet network comprising said FCoE device and a number of other FCoE devices; a VN_Port configured to interface with FC (Fibre Channel) devices in said Ethernet network; an FCoE_LEP (FCoE Link End-Point) interfacing said Ethernet MAC and said VN_Port, said FCoE_LEP configured to encapsulate FC frames into FCoE frames to be transmitted to said Ethernet network and decapsulate FC frames from FCoE frames received from said Ethernet work; and an address table configured to associate a plurality of FC port identifiers and a plurality of MAC addresses of said other FCoE devices in said Ethernet work so as to enable direct communications between said FCoE device and said other FCoE devices.

According to other embodiments of the present invention, a computer-readable storage medium comprises processor-executable instructions, wherein said instructions, while executed, causes a processor to: register a first FCoE (Fibre Channel over Ethernet) device with a name server in an Ethernet network comprising a plurality of FCoE devices, said name server configured to accept or reject said registration of said FCoE target device, and upon acceptance of said registration, to store at least one of a Port_Name and a Node_Name associated with said first FCoE device, wherein said Port_Name and said Node_Name are formatted to contain at least a MAC (Media Access Control) address associated with said first FCoE device so that said first FCoE device is discoverable to one or more of said plurality of FCoE devices for direct communications without using any FCoE switch. Alternatively, the computer-readable storage medium comprises processor-executable instructions, said instructions, while executed, causing a processor to: receive a fabric login request frame from an FCoE (Fibre Channel over Ethernet) device, said fabric login request frame generated by said FCoE device in accordance with a pre-defined format, and including at least one of a Port_Name and a Node_Node, said Port_Name and Node_Name formatted to describe a MAC (Media Access Control) address assigned to said FCoE device; in response to said fabric login request, assign a port identifier for a VN_Port to be created in said FCoE device; generate a fabric login reply frame to include said port identifier and said MAC address contained in least one of said Port_Name and Node_Name; send said fabric login reply frame to said FCoE device; and register said Port_Name or said Node_Name in a name server to which said FCoE device is registered. In another embodiment, the computer-readable storage medium comprises processor-executable instructions, said instructions, while executed, causing a processor to: query a name server to discover a plurality of FCoE devices in an Ethernet network, said name server configured to, in response to said query, retrieve a plurality of objects associated with said FCoE devices, each of said plurality of objects indicative of a MAC (Media Access Control) address of its associated FCoE device; receive said plurality of objects from said name server; and based upon said plurality of objects, generate a table that associates a plurality of FC (Fibre Channel) port identifiers with said MAC addresses of said FCoE devices.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to direct communications and frame routing between FCoE devices within an Ethernet network supporting FCoE protocols. In particular, embodiments of the present invention enables direct communications from an FCoE initiator to an FCoE target without going through any intermediary such as an FCF (FCoE Forwarder) that is designed to route traffic between FCoE devices according to the current FCoE standards. This is accomplished by registering the Ethernet MAC address of the VN_Port in an FCoE target in a Name Server by means of certain objects presently used in FIP, e.g., Port_Name or Node_Name. By querying the Name Server for the Ethernet MAC address of the FCoE target, an FCoE initiator is able to discover the FCoE target and send FCoE frames directly to the FCoE target according to the discovered Ethernet MAC address. According to embodiments of the present invention, there is no need for an FCoE switch to forward the traffic given that each FCoE device can register its MAC address in the Name Server following a registration process, and further, discover any other FCoE devices it needs to communicate with by querying the Name Server. In addition, embodiments of the present invention utilize standard-specified objects and functionalities without requiring any changes to the existing FCoE and FC standards.

Although embodiments of the invention may be described and illustrated herein with reference to current FCoE standards (e.g., FC-BB-5, rev. 2.00) and FC protocols according to which certain terms, objects, functions, commands, frame formats are specified in detail, it should be understood that applicability of embodiments of the present invention is not limited to these existing standards and protocols. In addition, although embodiments of the invention may be described and illustrated herein using particular network configurations (e.g., CEE), frame formats (e.g., FIP Virtual Link Instantiation Request Frame in FIG. 3), or address format (e.g., IEEE 48-bit Name_Identifier in FIG. 4), it should be understood that many variations can be implemented without departing from the spirit and scope of embodiments of the present invention.

Figure 1A:
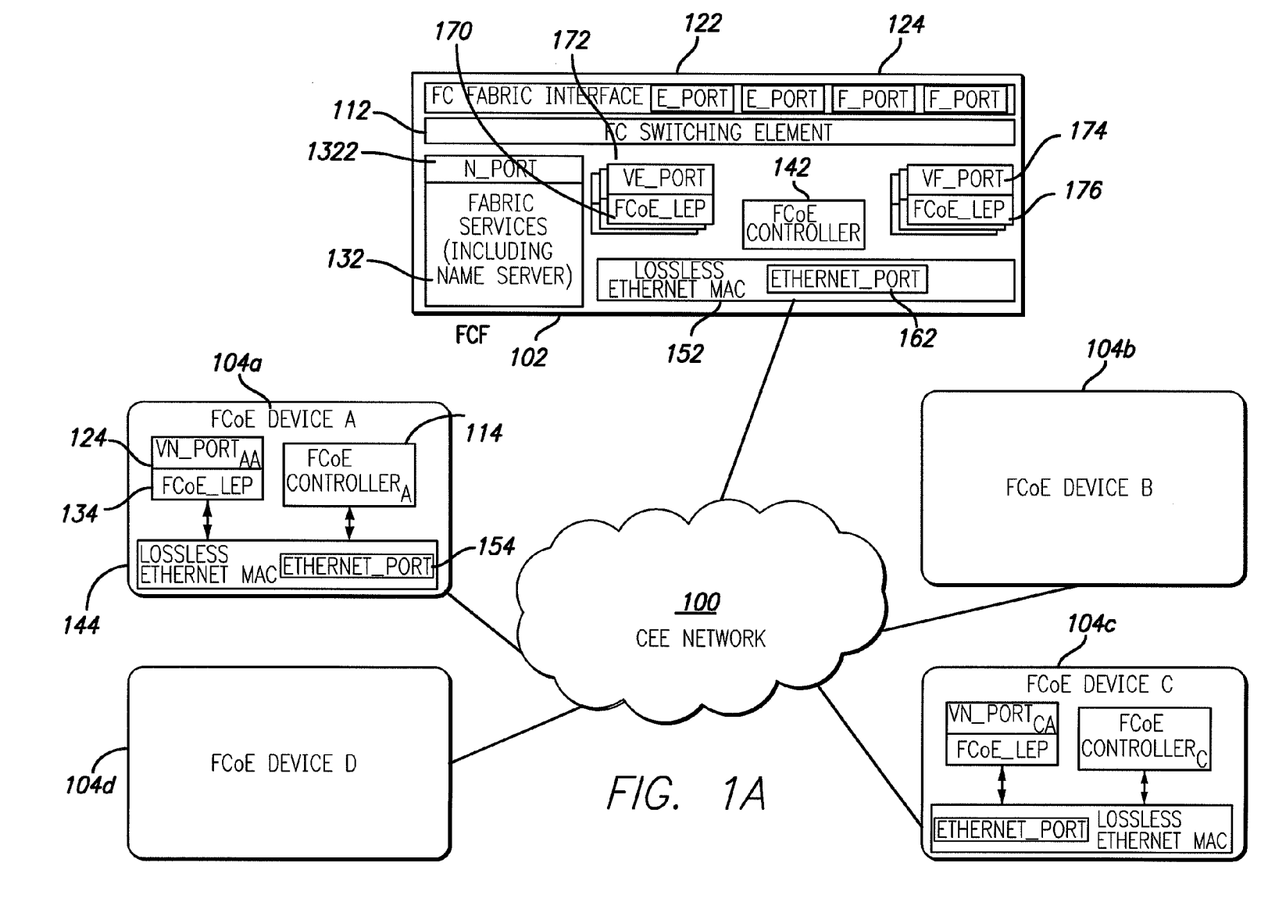
FIGS. 1*a-b* are block diagrams illustrating several exemplary network configurations supporting the FCoE protocols according to various embodiments of the present invention.
Figure 1B:
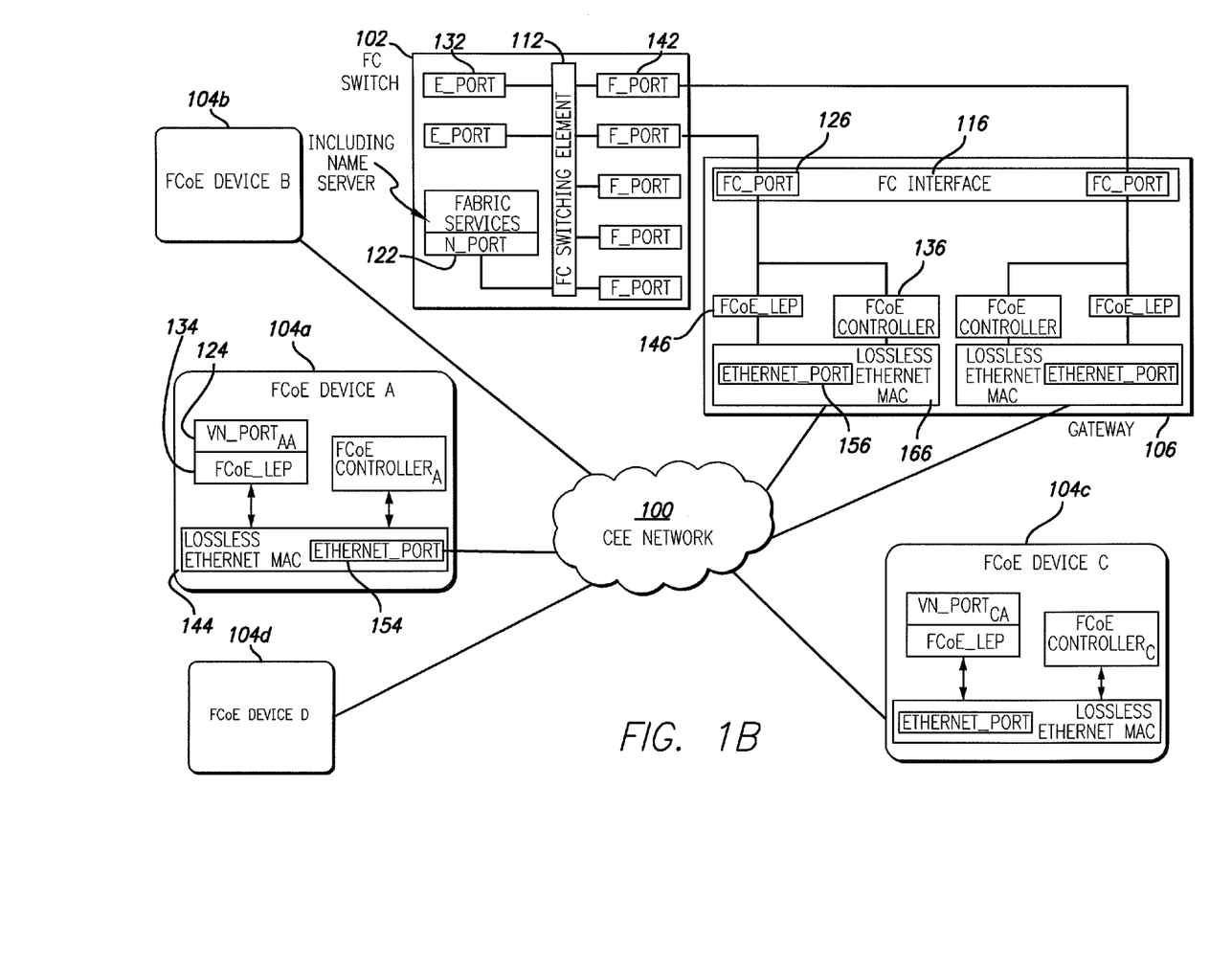

Referring now to FIGS. 1a-b, various exemplary network configurations supporting the FCoE protocols will be described according to one embodiment of the present invention. As shown in FIG. 1a, such a network configuration comprises a Lossless Ethernet network, e.g., the CEE network 100, over which there are a number of FCoE devices, such as exemplified FCoE Device A 104a, FCoE Device B 104b, FCoE Device C 104c, FCoE Device D 104d, all coupled to a FCF 102. An FCoE device can comprise a computer, a host server, a storage device, a switch, a router, a bridge and any other network element or entity configured to support FCoE protocols. It should be understood that any number of FCoE devices may be implemented in an FCoE network configuration, although only four devices are illustrated in FIG. 1a.

Using the FCoE Device A 104a as an example, a typical configuration of an FCoE device comprises an FCoE controller 114, a VN_Port 124, an FCoE_LEP (FCoE Link End-Point) 134, a Lossless Ethernet MAC 144 and an Ethernet_Port 154. As will be understood by any skilled artisan, an FCoE device is not limited to an implementation of the above components, and can be varied and customized with many other different components.

The FCoE controller 114 is a functional entity executing the FIP (FCoE Initialization Protocol) and instantiating VN_Ports and FCoE_LEPs as needed. It is coupled with the Lossless Ethernet MAC 144, which is a full duplex Ethernet MAC supporting at least 2.5 KB jumbo frames and implementing extensions to avoid Ethernet frame loss due to congestion. The Ethernet_Port 154 provides an interface between the FCoE device and the Ethernet network (e.g., CEE Network 100). In practice, the Ethernet_Port 154 is usually controlled by the Lossless Ethernet MAC 144.

The VN_Port or Virtual N_Port 124 is a data forwarding component that emulates an N_Port in FC protocols and is dynamically instantiated upon successful completion of a fabric login of the FCoE device. The VN_Port has different attributes including a VN_Port_Name, which is usually in a Name_Identifier format as exemplified in FIG. 3. The VN_Port is usually identified by an N_Port_ID that is dynamically assigned by a Fabric Service called the F_Port Controller. In operation, a VN_Port is configured to receive FC frames from the upper FC levels and send them to its associated FCoE_LEP for encapsulation and further transmission over the Lossless Ethernet network, such as the CEE network 100 shown in FIG. 1a. In the opposite direction, the VN_Port also receives FC frames from its FCoE_LEP after decapsulation and sends the FC frames to the upper FC levels.

The FCoE_LEP 134 is a functional entity that encapsulates FC frames into FCoE frames for transmission over the Ethernet network, and decapsulates FC frames out of received FCoE frames. The encapsulation/decapsulation is performed through a single Virtual Link (i.e., a logical link) between two FCoE_LEPs. This Virtual Link is defined by two parameters: the MAC address of the local link end-point and the MAC address of the remote link end-point. For example, if the FCoE devices 104a and 104c in FIG. 1a serve as local and remote link end-points respectively, a Virtual Link between the two devices can be defined by the Lossless Ethernet MAC of the FCoE device 104a and the Lossless Ethernet MAC of the FCoE device 104c. When encapsulating FC frames into FCoE frames to be sent from the FCoE device 104a to the FCoE device 104c, the FCoE_LEP in the device 104a uses the MAC address of the local link end-point (i.e., FCoE device 104a) as source address and the MAC address of the remote link end-point (i.e., FCoE device 104c) as destination address of the generated FCoE frames. On the other hand, when decapsulating FC frames from FCoE frames received from a remote link end-point (i.e., the FCoE device 104c), the FCoE_LEP in the device 104a verifies that the destination address of the received FCoE frame is equal to the MAC address of the local link end-point (i.e., FCoE device 104a).

In terms of communications, each FCoE device can be an Originator/Initiator or a Responder/Target depending on specific data flow within the network. According to the existing FCoE standards (e.g., FC-BB-5, rev. 2.00), the communications between various FCoE devices are coordinated through an FCF (FCoE Forwarder) that serves as a Fibre Channel Switching Element (see FC-SW-5) configured to transit traffic from an FCoE initiator to an FCoE target. FIG. 1a provides an exemplary configuration of a FCF 102.

As shown in FIG. 1a, the FCF 102 comprises a FC Switching Element 112 that is, on one end, coupled to a number of ports to which native FC devices are attached, such as an E_Port 122 and an F_Port 124, and on the other end, to an N_Port 1322 and associated Fabric Services 132 including Name Server. Similar to an FCoE device, the FCF 102 also comprises an FCoE Controller 142 coupled with a Lossless Ethernet MAC 152 and Ethernet_Port 162 interfacing the external CEE Network 100. Internally, the Lossless Ethernet MAC 152 and Ethernet_Port 162 are coupled with a number of VE_Ports or Virtual E_Ports, VF_Ports or Virtual F_Ports and their associated FCoE_LEP 170 or 176. In operation, an FCF receives FCoE frames from an FCoE initiator, determines the FCoE target based on the destination identifier (e.g., an N_Port identifier) of the FC frames encapsulated in the received FCoE frames, and finally forwards the FCoE frames to the FCoE target.

Similar to a basic FC switch, the FCF 102 also provides a function or service known as Name Server, which is essentially a directory of N_Ports within a fabric. As specified in the existing FC protocols, the Name Server maintains a database of N_Port identifiers for each node so that any node or N_Port attached to a fabric can discover other nodes, their attributes and N_Port identifiers, by referring to the Name Server. In operation, a node or N_Port, after a fabric login, is assigned with an N_Port identifier, and then may register the association between the node and related N_Ports in the Name Server, subject to the approval or rejection by the Name Server. After the registration, a group of objects describing the node will be stored in the Name Server, including a port type, port identifier, port name, node name, class of service and/or permanent port name (See FC-GS-6, rev. 9.21). Any registered node or N_Port can query the Name Server for attributes of all other nodes or N_Ports by submitting a query request, for example, a GA_NXT (Get All Next) query.

The data-forwarding decision and related functionalities can be performed in an integrated component, such as the FCF 102 shown in FIG. 1a, or split over a few separate components, such as a FC switch coupled with a Gateway shown in FIG. 1b, where an alternative Ethernet network configuration enabling FCoE protocols is provided. As compared to the network configuration in FIG. 1a, no FCF is used in FIG. 1b, and instead, a FC Switch 102 and a Gateway 106 coupled therewith are implemented. The FC Switch 102 comprises a FC Switching Element 112 that is coupled with a number of E_Ports 132 and F_Ports 142, in addition to an N_Port 122 and associated Fabric Services including a Name Server. Each F_Port 142 in the FC Switch 102 corresponds to a FC_Port 126 of an FC Interface 116 in the Gateway 106. Inside the Gateway 106, each FC_Port 126 is associated with an FCoE_LEP that translates between FC frames and FCoE frames. Each FC_Port 126 is also associated with an FCoE Controller 136, which, as described above, is usually coupled with a Lossless Ethernet MAC 166 and Ethernet_Port 156. In operation, the Gateway 106 serves as the interface with the CEE network 100 and receives FCoE frames from an FCoE initiator. The Gateway 106 is configured to decapsulate FC frames out of the received FCoE frames and transmit the FC frames to the FC Switch 102, which will determine the target device for data transmission from the FC frames.

As aforementioned, the current FCoE standard requires an FCF to act as an intermediary during the communications between FCoE devices. In other words, the traffic from an FCoE Initiator to an FCoE Target has to go through the FCF, in addition to any other necessary bridges or switches (e.g., FC bridges and switches not shown in FIG. 1) over the Ethernet network. Without requiring any modification to the standard, embodiments of the present invention enables registration of the FCoE devices with a Name Server using the values of existing objects, such as Port_Name and Node_Name, during a fabric login, thereby allowing the FCoE devices to discover and directly communicate with all other devices in the network. An exemplary process for an FCoE device to register its Ethernet MAC address with a Name Server in the FCF will be described below in detail with reference to FIG. 2.

Figure 2:
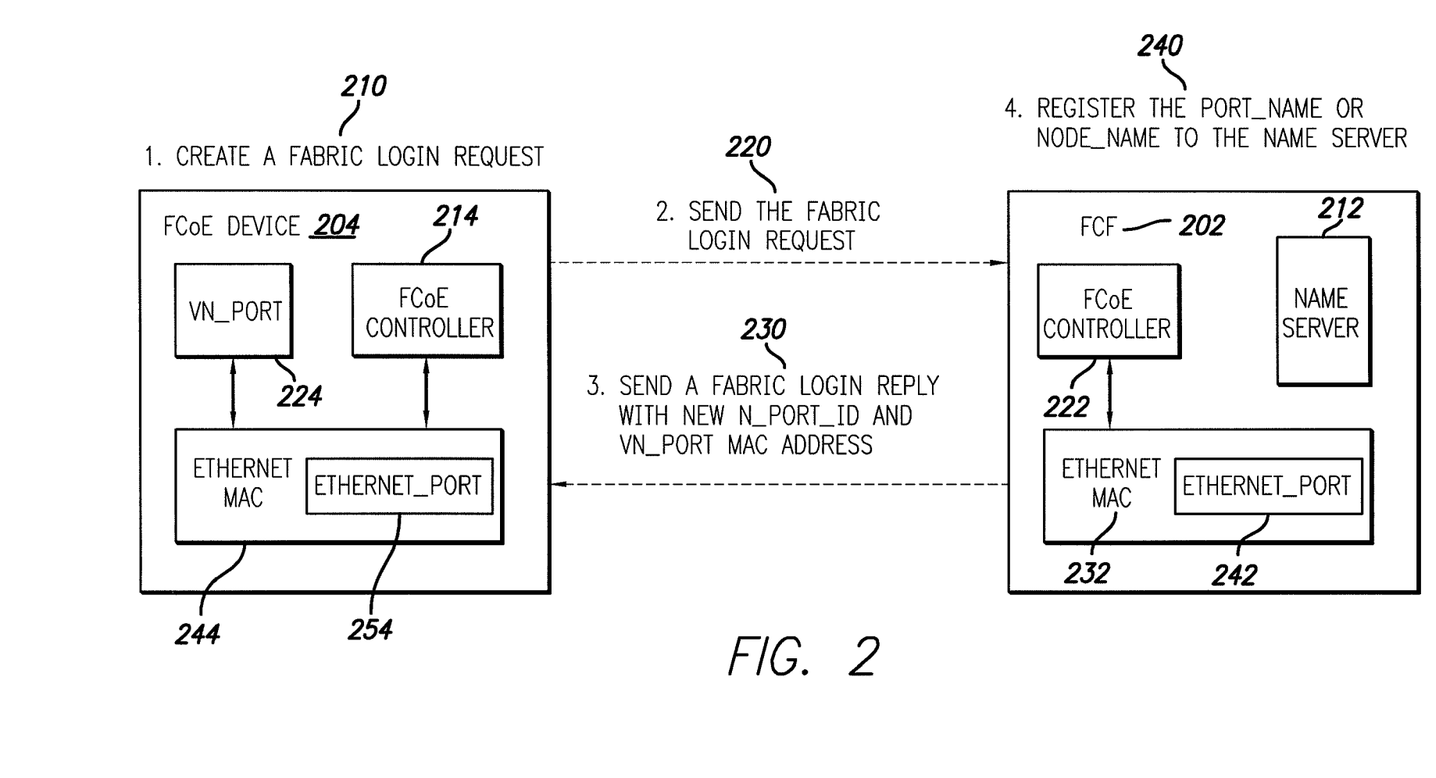
FIG. 2 is a block diagram illustrating an exemplary FCoE device registration process in the CEE network illustrated in FIGS. 1*a-b* according to various embodiments of the present invention.

As shown in FIG. 2, the MAC address registration process starts at step 210, at which an FCoE device 204 generates a fabric login request. Specifically, the FCoE controller 214 in the FCoE device 204 executes the FIP and instantiates a VN_Port using the information from an extended link service request, for example, an FDISC ELS request. The FCoE device 204 already has a VN_Port 224, and another VN_Port is to be provided by the FCF in response to the fabric login request.

Figure 3:
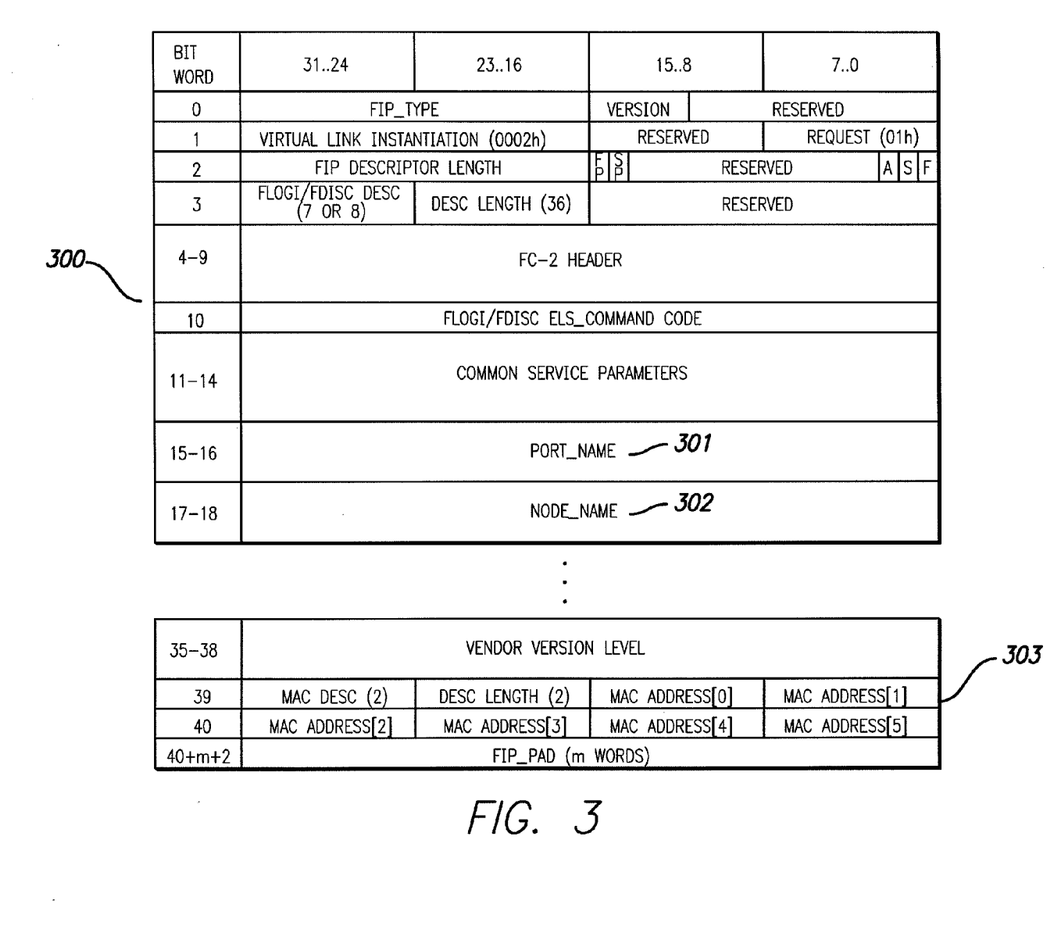
FIG. 3 provides an exemplary FIP (FCoE Initialization Protocol) Virtual Link Instantiation Request Frame according to various embodiments of the present invention.
Figure 4:
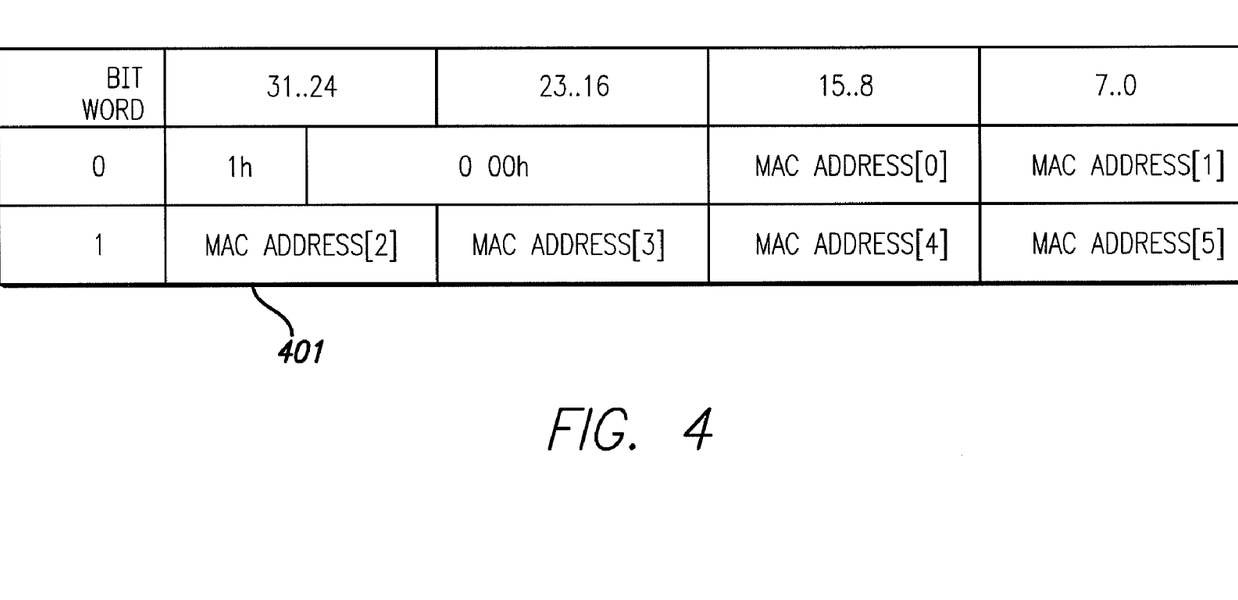
FIG. 4 provides an exemplary Name_Identifier format, i.e., the IEEE 48-bit Address format, according to various embodiments of the present invention.

In one embodiment, the fabric login request is created in a standard-specified format, i.e., FIP Virtual Link Instantiation Request Frame 300 as illustrated in FIG. 3. This request frame 300 includes multiple fields, such as FIP_Type, FIP Descriptor Length, FC-2 Header, Port_Name, Node_Name, etc. Specific definitions and configurations can be found in the current FCoE standard (See FC-BB-5, rev. 2.00, section 7.7). Among these fields, the Port_Name 301 uniquely identifies an N_Port that serves as an interface between the FCoE device 204 and the Ethernet, and the Port_Name 301 can be dynamically assigned during the fabric login. Another field, Node_Name 302, uniquely identifies a number of N_Ports that belong to the same group. The Port_Name 301 and Node_Name 302 can be defined in a particular format as shown in FIG. 4, namely, IEEE 48-bit Address Name_Identifier. As seen in FIG. 4, the IEEE 48-bit Address format 400 comprises words indicating MAC addresses 401, which means, that it is feasible to make the values or contents of either Port_Name or Node_Name equal to the Ethernet MAC address of the FCoE device. The benefit of doing so is to register the Ethernet MAC address of an FCoE device into the FCF through the existing fields of Port_Name and/or Node_Name without creating new objects or modifying the current FIP.

In creating a fabric login request in such a format as shown in FIG. 3, the FCoE controller 214 sets values in each field of the request frame 300. For example, the FCoE controller 214 uses the contents of the Port_Name 301 or Node_Name 302 to create the FIP MAC address descriptor 303. In addition, the FCoE controller 214 sets the FP (Fabric Provided) field in the FIP operation header to zero and the SP (Server Provided) field to one to indicate that an SPMA (Server Provided MAC Address) being requested.

Referring back to FIG. 2, once the fabric login request is created, the FCoE controller 214 sends the request to the FCF 202 at step 220. The FCoE controller 222 of the FCF 202 receives the request, and in response, instantiates a VN_Port by assigning an N_Port identifier (N_Port_ID). Also, the FCoE controller 222 obtains the MAC address specified in the FIP Virtual Link Instantiation request. At step 230, the FCoE controller 222 of FCF 202 sends a fabric login reply frame that contains the N_Port identifier and VN_Port MAC address back to the FCoE device 204. At step 240, either the Port_Name or Node_Name whose value is equal to the new VN_Port MAC address is registered in the Name Server 212 of the FCF 202.

Figure 5:
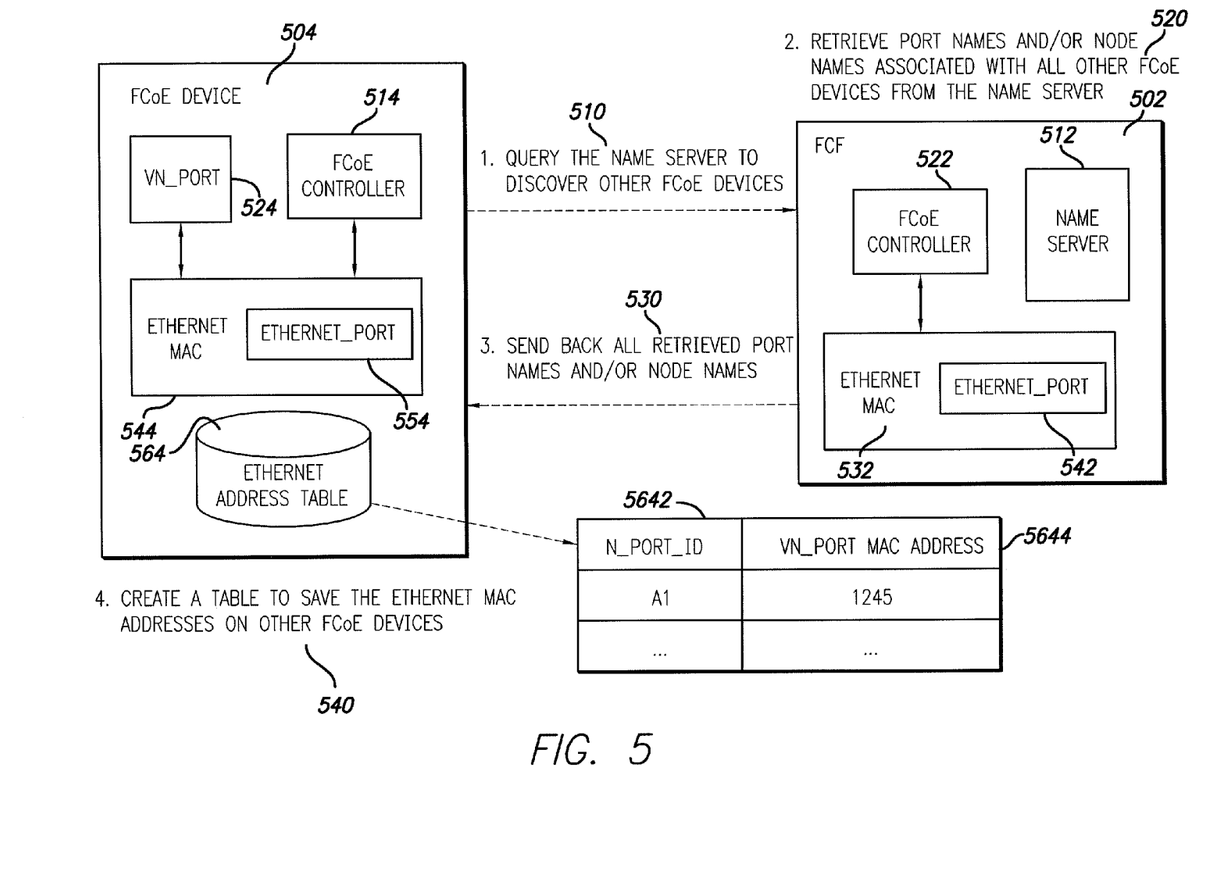
FIG. 5 is a block diagram illustrating an exemplary FCoE device discovery process in the CEE network illustrated in FIGS. 1*a-b* according to various embodiments of the present invention.

Each FCoE device over the Ethernet network can follow the above-described registration process to register its VN_Port MAC address with a Name Server through its associated Port_Names and/or Node_Names. As a result, any FCoE device can discover all other FCoE devices in the network by simply querying the Name Server. FIG. 5 provides a block diagram illustrating an exemplary FCoE device discovery process involving a Name Server query according to one embodiment of the present invention.

As shown in FIG. 5, the exemplary discovery process starts at step 510, where the FCoE device 504 queries the Name Server 512 of the FCF 502 to discover all other FCoE devices in the network. This can be accomplished by using the GA_NXT (Get All Next) query to retrieve the Port_Names or Node_Names associated with each one of the FCoE devices within the network. In response to the query, at step 520 these Port_Names or Node_Names whose values or contents are representative of the VN_Port MAC addresses of all those FCoE devices are retrieved from the Name Server 512, and subsequently, sent back to the requesting FCoE device 504 at step 530. Once the Port_Names or Node_Names of all other FCoE devices are received, at step 540 the FCoE device 504 programs an Ethernet address table 564 that associates N_Port identifiers 5642 (i.e., N_Port_ID) with VN_Port MAC addresses 5644. With this address table 564, the FCoE device 504 is able to identify any other FCoE device that it needs to communicate with, as will be described in detail below with reference to FIG. 6.

Figure 6:
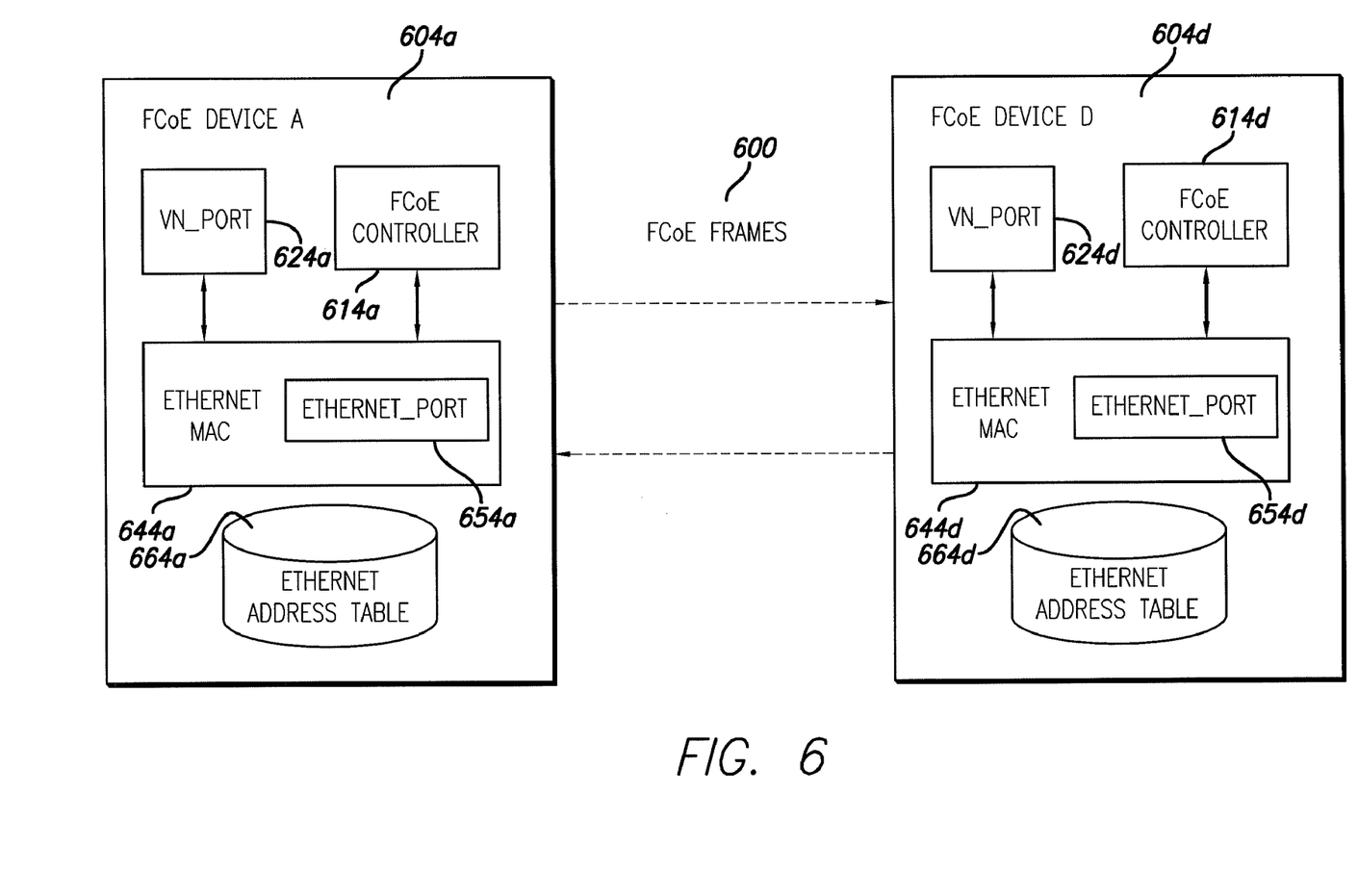
FIG. 6 is a block diagram illustrating two exemplary FCoE devices directly communicating with each other without an FCoE switch in the CEE network illustrated in FIGS. 1*a-b* according to various embodiments of the present invention.

Because each FCoE device over the Ethernet network can follow the above-described discovery process to build an address table from which VN_Port MAC addresses of all other FCoE devices can be easily identified, the FCoE device can initiate and send FCoE frames directly to an FCoE target according to the address table. For example, FIG. 6 demonstrates two FCoE devices: FCoE Device A 604a and FCoE Device D 604d, which can directly communicate with each other without going through an FCoE switch according to one embodiment of the present invention. In FIG. 6, the FCoE Device A 604a maintains an Ethernet address table 664a resulting from a discovery process such as the one illustrated in FIG. 5, which contains associations between N_Port identifiers and VN_Port MAC addresses of all other FCoE devices including the FCoD Device D 604d. Similarly, the FCoE Device D 604d contains an address table 664d that associates N_Port identifiers and VN_Port MAC addresses of all other FCoE devices including the FCoD Device A 604a. When the FCoE Device A 604a, as an FCoE initiator, is ready to send FCoE frames in which FC frames are encapsulated, the FCoE Device A 604a can refer to its address table 664a and identify the MAC address of the destination VN_Port using the N_Port identifier indicated by the encapsulated FC frames. Assuming the destination VN_Port MAC address is identified to be an Ethernet MAC address of the FCoE Device D 604d, the FCoD Device A 604a can send the FCoE frames directly to the destination VN_Port in the FCoE Device D 604d without relying on the FCF to decide which FCoE device is the target. Similarly, by using the address table 664d, the FCoE Device D 604d can send FCoE frames directly to the FCoE Device A 604a without needing the FCF as the forwarding intermediary.

Figure 7:
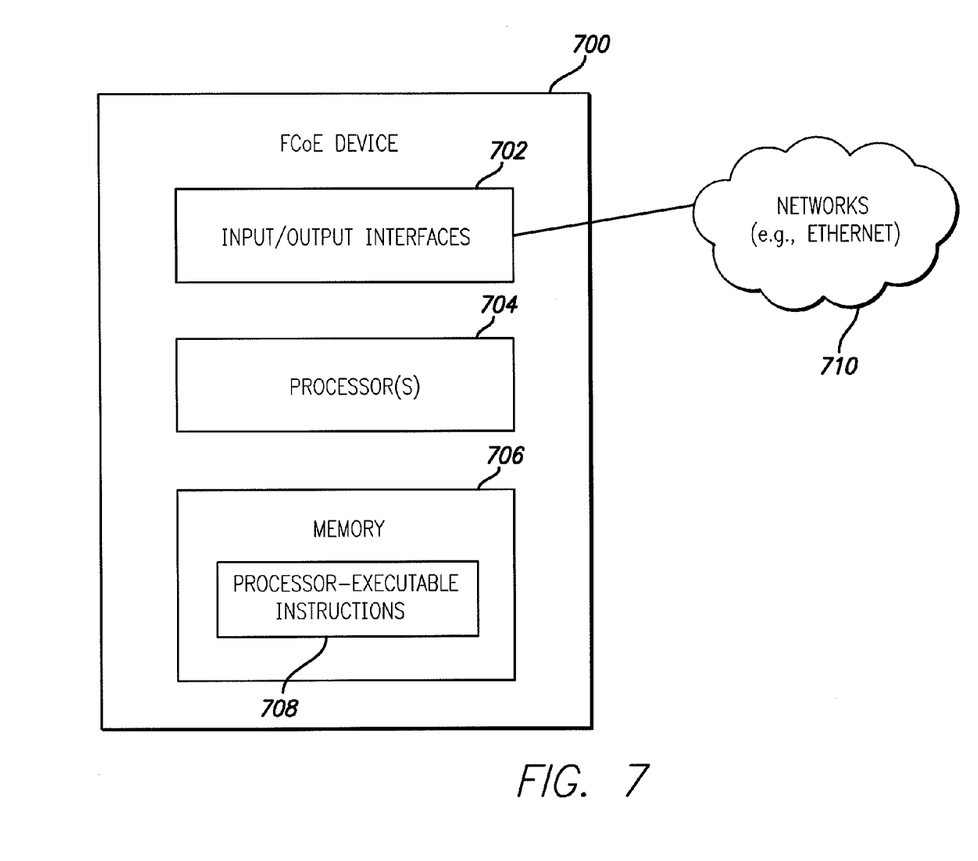
FIG. 7 is a block diagram illustrating an exemplary configuration of an FCoE device according to various embodiments of the present invention.

FIG. 7 is a block diagram of an exemplary configuration of an FCoE device 700 in accordance with one embodiment of the present invention. As illustrated in FIG. 7, the FCoE device 700 includes one or more input/output (I/O) interfaces 702, at least one processor 704, and memory space 706. The I/O interfaces 702 enable the FCoE device 700 to communicate over one or more networks 710, such as an Ethernet network that enables FCoE protocols. The I/O interfaces 702 include interfaces such as a network interface card, a modem, a USB connector, one or more network ports (e.g., Ethernet_Port, VN_Port or N_Port), and some combination thereof.

Processor(s) 704 may be implemented using any applicable processing-capable technology. Processor(s) 704 may be one or more processors such as central processing units (CPUs), microprocessors, controllers, dedicated processing circuits, digital signal processors (DSPs), processing portion(s) of an ASIC, some combination thereof, and so forth. Generally, processors 704 are capable of executing, performing, and/or otherwise effectuating processor-executable instructions, such as processor-executable instructions 708 in the memory 706.

The memory 706 comprises portions of computer-readable storage media, which may include volatile and non-volatile media, removable and non-removable media, storage and transmission media, and so forth. The memory 706 is tangible media when it is embodied as a manufacture and/or a composition of matter. By way of example only, storage media may include an array of disks or flash memory for longer-term mass storage of processor-executable instructions, random access memory (RAM) for shorter-term storing of instructions that are currently being executed and/or otherwise processed, hard-coded logic media (e.g., an application-specific integrated circuit (ASIC), a field programmable gate-array (FPGA), etc.), some combination thereof, and so forth. Transmission media may include link(s) on networks for transmitting communications and so forth.

In one embodiment, the memory 706 is comprised of one or more processor-accessible media, such as the processor-executable instructions 708 that are executable by the processor 702 to enable the FCoE device 700 to perform the various functions and operations described herein, including (by way of example only) any of those that are associated with the illustrated features, aspects, components, and flow diagrams of FIGS. 1-6. It should be noted that processor(s) 702 and memory 706, including the processor-executable instructions 708 thereof, may be integrated on a single chip or otherwise interwoven.

An FCoE switch can be configured in a way similar to the above-described exemplary FCoE device 700, except that the processor-executable instructions implemented therein enable the FCoE switch to perform additional functions and operations described herein, such as acceptance or rejection of FCoE device registration, traffic forwarding between different FCoE devices, etc. The FCoE switch may include various components as defined by the FCoE and FC standards and customized by different vendors.

Embodiments of the present invention may be described in the general context of processor-executable instructions. Processor-executable instructions may include programs, applications, coding, modules, objects, interfaces, components, data structures, frame organizations and/or preamble content, etc. that perform and/or enable the performance of particular tasks and/or implement particular data structures. Processor-executable instructions may be located in separate storage media, executed by different processors, and/or propagated over or extant on various transmission media. Moreover, processor-executable instructions may be embodied as software, firmware, hardware, fixed logic circuitry, some combination thereof, and so forth.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of enabling direct communications between a number of Fibre Channel over Ethernet (FCoE) devices in an Ethernet network, said method comprising:
   registering said FCoE devices with a name server in said Ethernet network, said name server configured to accept or reject registration of each FCoE device, and upon acceptance of a registration, store at least one object associated with the registered FCoE device, said at least one object comprising a Port_Name or a Node_Name containing a Media Access Control (MAC) address of the FCoE device;
   receiving, at said name server, a discovery request from an origination FCoE device to discover all other registered FCoE devices in said Ethernet network; and
   in response to said discovery request, retrieving a plurality of objects stored in said name server for said other registered FCoE devices and sending said objects to said origination FCoE device, each of said objects indicative of a MAC address of its associated FCoE device.

2. The method of claim 1, further comprising:
   generating a table in said origination FCoE device based upon said objects, said table having associations between a plurality of Fibre Channel (FC) port identifiers and said MAC addresses of said other registered FCoE devices.

3. The method of claim 2, further comprising:
   determining a FC port identifier of a destination FCoE device to which data is transmitted; and identifying from said table a MAC address corresponding to said destination FC port identifier of said destination FCoE device.

4. The method of claim 3, further comprising:
sending FCoE frames from said origination FCoE device directly to said destination FCoE device in accordance with said identified MAC address.

5. The method of claim 1, wherein each FCoE device is registered with said name server through a process comprising:
generating a fabric login request frame in said FCoE device in accordance with a pre-defined format, said fabric login request frame including a Port_Name and a Node_Name, either said Port_Name or said Node_Name containing a MAC address assigned to said FCoE device; and
sending said fabric login request frame to a FCoE switch for a VN_Port to be created in said FCoE device.

6. The method of claim 5, wherein said process further comprises:
in response to said fabric login request frame, generating a fabric login reply frame in said FCoE switch, said fabric login reply frame containing said MAC address of said FCoE device and a port identifier assigned to said VN_Port in said FCoE device;
sending said fabric login reply frame to said FCoE device; and
registering said Port_Name and said Node_Name with said name server.

7. The method of claim 6, wherein said process further comprises registering device attributes of said FCoE device with said name server.

8. The method of claim 6, further comprising creating said VN_Port in said FCoE device using said MAC address and said port identifier.

9. The method of claim 6, wherein said name server is implemented in said FCoE switch in said Ethernet network, said FCoE switch configured to communicate with said FCoE devices.

10. The method of claim 1, wherein each FCoE device comprises an FCoE controller configured to execute a fabric login that allows said FCoE device to be registered with said name server.

11. The method of claim 1, wherein each FCoE device comprises an Ethernet port to interface with said Ethernet network, and a VN_Port to interface with FC layers.

12. The method of claim 1, wherein each FCoE device comprises a component configured to encapsulate Fibre Channel (FC) frames into FCoE frames and decapsulate FC frames out of FCoE frames.

13. A method of registering an Fibre Channel over Ethernet (FCoE) device with a name server in an Ethernet network, said method comprising:
generating a fabric login request frame in said FCoE device in accordance with a pre-defined format, said fabric login request frame including at least a Port_Name that contains a Media Access Control (MAC) address assigned to said FCoE device;
sending said fabric login request frame to a FCoE switch;
in response to receiving said fabric login request frame in said FCoE switch, assigning a port identifier for a VN_Port to be created in said FCoE device;
sending a fabric login reply frame to said FCoE device, said fabric login reply frame including said port identifier for said VN_Port and said MAC address contained in said Port_Name; and
registering said Port_Name in said name server.

14. The method of claim 13, wherein said fabric login request frame further includes a Node_Name containing said MAC address assigned to said FCoE device.

15. The method of claim 14, further comprising:
registering said Node_Name in said name server, wherein said fabric login reply frame further comprises said Node_Name.

16. The method of claim 13, further comprising storing attributes of said registered FCoE device in said name server in said Ethernet network.

17. The method of claim 13, further comprising:
allowing a first FCoE device to query said name server for all registered FCoE devices including said FCoE device;
in response to said query, retrieving said Port_Name associated with said FCoE device and sending said MAC address contained in said Port_Name to said FCoE device; and
storing an association between said MAC address and an FC port identifier in a table in said first FCoE device, said table including associations between a plurality of FC port identifiers and MAC addresses of registered FCoE devices.

18. The method of claim 17, further comprising:
generating FCoE frames in said first FCoE device, said FCoE frames having FC frames encapsulated therein, at least one of said FC frames indicating a destination port identified by said FC port identifier;
identifying said MAC address from said table according to said FC port identifier; and
sending said FCoE frames to said FCoE device using said MAC address without going through said FCoE switch.

19. A method for one Fibre Channel over Ethernet (FCoE) device to discover and directly communicate with other FCoE devices in an Ethernet network supporting FCoE protocols, said method comprising:
sending a query from said one FCoE device to a name server to discover said other FCoE devices registered with said name server;
in response to said query, retrieving one or more Port_Names or one or more Node_Names associated with said other FCoE devices that are pre-stored in said name server during a fabric login of each of said FCoE devices, each of said one or more Port_Names and Node_Names formatted to contain an Ethernet MAC address of its associated FCoE device;
sending said retrieved one or more Port_Names or Node_Names associated with said other FCoE devices to said one FCoE device;
generating a table in said one FCoE device in accordance with said retrieved one or more Port_Names or Node_Names, said table containing associations between a plurality of Fibre Channel (FC) port identifiers and a plurality of Ethernet Media Access Control (MAC) addresses of said other FCoE devices; and
sending FCoE frames from said one FCoE device directly to any of said other FCoE devices in accordance with said table.

20. The method of claim 19, wherein said name server provides a directory of said FCoE devices in said Ethernet network, said name server configured to store attributes of registered FCoE devices.

21. The method of claim 19, wherein each FCoE device is configured to generate a fabric login request frame according to a pre-defined format, said fabric login request frame including at least one of said Port_Name and said Node_Name.

22. The method of claim 21, wherein each FCoE device is further configured to send said fabric login request frame to a FCoE switch for a new VN_Port to be created.

23. The method of claim 22, wherein each FCoE device is further configured to receive a port identifier and a MAC address associated with said new VN_Port through a fabric login reply frame from said FCoE switch, said fabric login reply frame including at least one of said Port Name and said Node Name.

24. The method of claim 22, wherein said name server is implemented in said FCoE switch.

25. The method of claim 19, wherein sending the FCoE frames from said one FCoE device further comprises:
   identifying a destination FC port identifier from FC frames encapsulated in said FCoE frames;
   identifying a destination Ethernet MAC address associated with said destination FC port identifier in accordance with said table; and
   transmitting said FCoE frames to a destination FCoE device in accordance with said destination Ethernet MAC address.

26. A system comprising:
   a plurality of Fibre Channel over Ethernet (FCoE) devices over an Ethernet network, said FCoE devices registered with a name server, wherein each FCoE device is configured to:
   query said name server to retrieve a plurality of objects associated with other FCoE devices, each of said plurality of objects comprising a Port_Name or a Node_Name formatted to describe a Media Access Control (MAC) address of its associated FCoE device,
   create a table based upon said plurality of objects, said table including associations between a plurality of Fibre Channel (FC) port identifiers and said MAC addresses of said FCoE devices;
   identify from said table a MAC address of a destination FCoE device corresponding to a destination FC port identifier; and
   send FCoE frames with FC frames encapsulated therein directly to said destination FCoE device in accordance with said identified MAC address.

27. The system of claim 26, wherein each FCoE device is configured to register with said name server through:
   generating a fabric login request frame in said FCoE device in accordance with a pre-defined format, said fabric login request frame including at least one of a Port_Name and a Node_Name, either said Port_Name or said Node_Name containing a MAC address assigned to said FCoE device;
   sending said fabric login request frame to a FCoE switch for a VN_Port to be created in said FCoE device;
   assigning a port identifier for said VN_Port in said FCoE device;
   sending a fabric login reply frame to said FCoE device, said fabric login reply frame including said port identifier and said MAC address contained in either said Port_Name or said Node_Name; and
   registering said Port_Name or said Node_Name in said name server.

28. An Fibre Channel over Ethernet (FCoE) device comprising:
   an FCoE controller;
   an Ethernet Media Access Control (MAC) coupled with said FCoE controller;
   an Ethernet port configured to interface with an Ethernet network comprising said FCoE device and a number of other FCoE devices;
   a VN_Port having a distinct Fibre Channel (FC) port identifier and Port_Name, said VN_Port being an end point for FC frame communications;
   an FCoE Link End-Point (FCoE_LEP) interfacing said Ethernet MAC and said VN_Port, said FCoE_LEP configured to encapsulate FC frames into FCoE frames to be transmitted to said Ethernet network and decapsulate FC frames from FCoE frames received from said Ethernet network; and
   an address table configured to associate a plurality of FC port identifiers and a plurality of MAC addresses of said other FCoE devices in said Ethernet network so as to enable direct communications between said FCoE device and said other FCoE devices.

29. The FCoE device of claim 28, wherein an FCoE switch connects said FCoE device to said number of other FCoE devices in said Ethernet network, wherein said FCoE switch maintains a name server configured to store attributes of registered FCoE devices, said name server further configured to accept or reject registration of said FCoE device.

30. The FCoE device of claim 28, wherein said FCoE controller is further configured to generate a fabric login request frame according to a pre-defined format, said fabric login request frame including at least one of a Port_Name and a Node_Name, said Port_Name and said Node_Name formatted to describe a MAC address assigned to said FCoE device.

31. The FCoE device of claim 30, wherein said FCoE controller is further configured to send said fabric login request frame to said FCoE switch for a VN_Port to be created in said FCoE device.

32. The FCoE device of claim 30, wherein said FCoE controller is further configured to receive a fabric login reply frame including a port identifier assigned for said VN Port and said MAC address contained in either said Port_Name or said Node_Name.

33. The FCoE device of claim 28, configured to query a name server in an FCoE switch to discover said number of other FCoE devices.

34. The FCoE device of claim 33, further configured to create said address table based upon a number of objects associated with said number of other FCoE devices that are retrieved and returned by said name server in response to said query.

35. The FCoE device of claim 34, wherein said number of objects include Port_Names of said number of other FCoE devices, each Port_Name formatted to describe an Ethernet MAC address of its associated FCoE device.

36. The FCoE device of claim 34, wherein said number of objects include Node_Names of said number of other FCoE devices, each Node_Name formatted to describe an Ethernet MAC address.

37. A server comprising the FCoE device of claim 28.

38. A non-transitory computer-readable storage medium comprising processor-executable instructions, said instructions, while executed, causing a processor to:
   register a first Fibre Channel over Ethernet (FCoE) device with a name server in an Ethernet network comprising a plurality of FCoE devices, said name server configured to accept or reject said registration of said FCoE target device, and upon acceptance of said registration, to store at least one of a Port_Name and a Node_Name associated with said first FCoE device,
   wherein said Port_Name and said Node_Name are formatted to contain at least a Media Access Control (MAC) address associated with said first FCoE device so that said first FCoE device is discoverable to one or more of said plurality of FCoE devices for direct communications without using any FCoE switch.

39. The non-transitory computer-readable storage medium of claim 38 comprising further processor-executable instructions, while executed, causing the processor to:
generate a fabric login request frame in accordance with a pre-defined format, said fabric login request frame including at least one of said Port_Name and said Node_Name; and
send said fabric login request frame to an FCoE switch for a VN_Port to be created in said first FCoE device.

40. A non-transitory computer-readable storage medium comprising processor-executable instructions, said instructions, while executed, causing a processor to:
receive a fabric login request frame from an Fibre Channel over Ethernet (FCoE) device, said fabric login request frame generated by said FCoE device in accordance with a pre-defined format, and including at least one of a Port_Name and a Node_Node, said Port_Name and Node_Name formatted to describe a Media Access Control (MAC) address assigned to said FCoE device;
in response to said fabric login request, assign a port identifier for a VN_Port to be created in said FCoE device;
generate a fabric login reply frame to include said port identifier and said MAC address contained in least one of said Port_Name and Node_Name;
send said fabric login reply frame to said FCoE device; and
register said Port_Name or said Node_Name in a name server to which said FCoE device is registered.

41. A non-transitory computer-readable storage medium comprising processor-executable instructions, said instructions, while executed, causing a processor to:
query a name server to discover a plurality of FCoE devices in an Ethernet network, said name server configured to, in response to said query, retrieve a plurality of objects associated with said FCoE devices, said plurality of objects associated with said FCoE devices comprising one or more Port_Names or Node_Names, each of said Port_Name and Node_Name formatted to describe a Media Access Control (MAC) address of one of said FCoE devices;
receive said plurality of objects from said name server; and
based upon said plurality of objects, generate a table that associates a plurality of Fibre Channel (FC) port identifiers with said MAC addresses of said FCoE devices.

42. The non-transitory computer-readable storage medium of claim 41 comprising further processor-executable instructions, while executed, causing the processor to:
identify a destination FC port identifier of a destination FCoE device to which FCoE frames are to be transmitted;
identify from said table a MAC address of said destination FCoE device corresponding to said destination FC port identifier; and
send said FCoE frames directly to said destination FCoE device in accordance with said identified MAC address of said destination FCoE device.

43. The non-transitory computer-readable storage medium of claim 41, wherein said FCoE devices are registered in said name server during a fabric login process comprising:
generating a fabric login request frame in accordance with a pre-defined format, said fabric login request frame including at least one of a Port_Name and a Node_Name, said Port_Name and said Node_Name formatted to describe a MAC address to be assigned by said FCoE switch; and
sending said fabric login request frame to a FCoE switch for a VN_Port to be created in one FCoE device; and
registering said Port_Name or Node_Name in said name server.

* * * * *